(No Model.) 2 Sheets—Sheet 1.

W. S. WALKER.
CORN PLANTER.

No. 430,451. Patented June 17, 1890.

Witnesses
Sidney P. Hollingsworth
Baltus D. Long

Inventor
W. S. Walker,
By his Atty's.
Baldwin Davidson & Wight (No Model.) 2 Sheets—Sheet 2.

W. S. WALKER.
CORN PLANTER.

No. 430,451. Patented June 17, 1890.

Attest:

Inventor:
W. S. Walker.

by his Attorneys

UNITED STATES PATENT OFFICE.

WARREN STONE WALKER, OF MANCHAC, LOUISIANA.

CORN-PLANTER.

SPECIFICATION forming part of Letters Patent No. 430,451, dated June 17, 1890.

Application filed January 30, 1890. Serial No. 338,561. (No model.)

*To all whom it may concern:*

Be it known that I, WARREN STONE WALKER, a citizen of the United States, residing at Manchac, in the parish of East Baton Rouge and State of Louisiana, have invented certain new and useful Improvements in Corn-Planters, of which the following is a specification.

The object of my invention is to provide an improved machine for planting corn in hills at regular intervals without destroying or injuring corn already planted or sprouted.

My machine is adapted to plant corn in check-rows in the usual way or to "replant"—that is, supply seed-corn to the missing hills or gaps in corn-rows.

The advantages of a machine of this construction are numerous. In the first place it is adapted to do the original planting, it is adapted to supply any omissions in the first planting without injury to the growing crop, and it is adapted to fill in any gaps caused by imperfect sprouting of the grain on the destroyal of the germ by insects or other causes.

Figure 1:
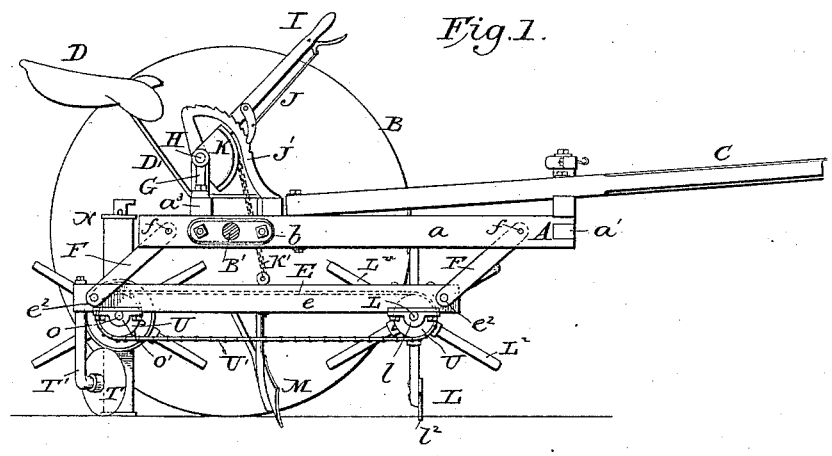
Figure 2:
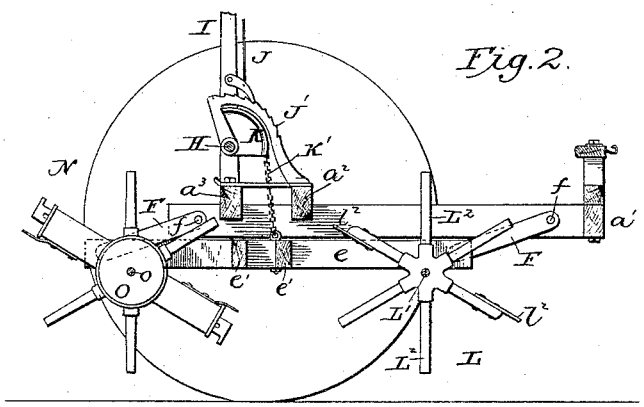
Figure 3:
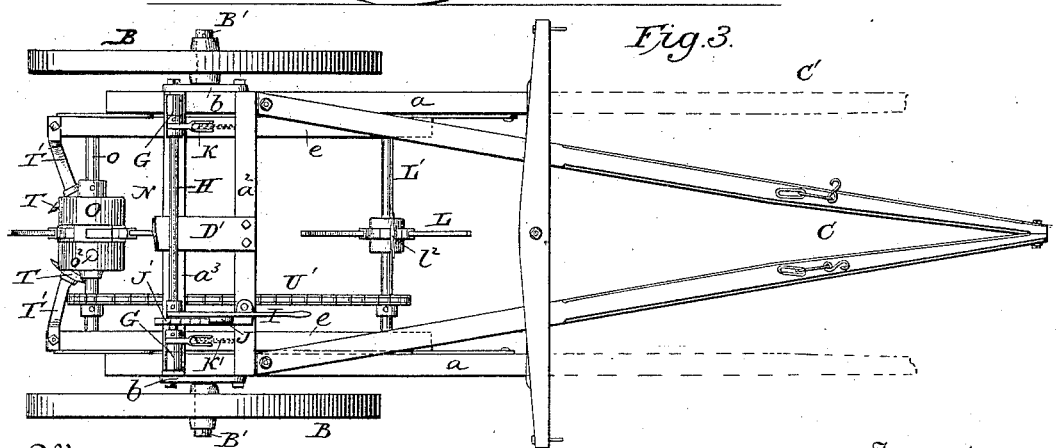
Figure 4:
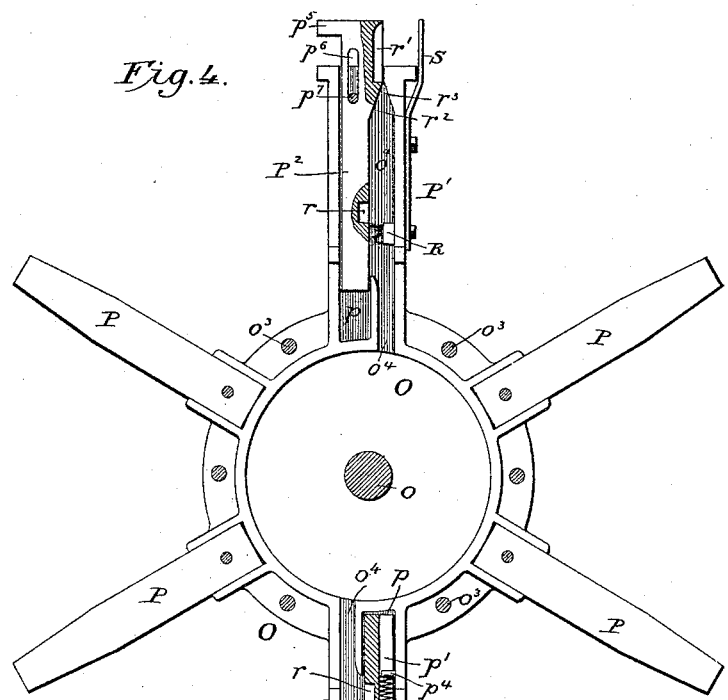
Figure 5:
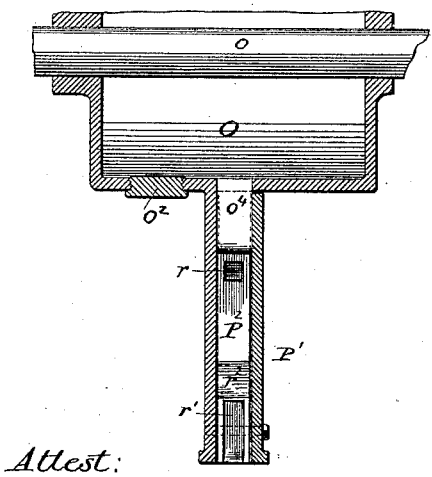
Figure 6:
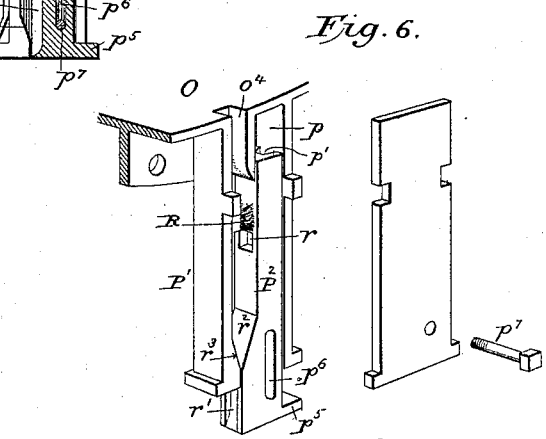

In the accompanying drawings, illustrating my invention, Figure 1 is a side elevation of my machine with one of the carrying-wheels removed. Fig. 2 is a longitudinal section taken inside the main frame. Fig. 3 is a plan view. Fig. 4 is a detail view on an enlarged scale, partly in section, of the planting-wheel. Fig. 5 is a detail view, in section, of the same; and Fig. 6 is a perspective view of the plunger and its casing.

The main frame A may be of any suitable construction. As shown, it is a skeleton frame composed of parallel side beams $a$, united by a front cross-beam $a'$ and a central cross-beam $a^2$. The carrying-wheels B are preferably mounted on short stud-axles B', secured to the side beams $a$ by brackets $b$. The tongue or pole C may be of any suitable construction and secured to the frame as indicated or in any other suitable manner. Shafts C', as indicated in dotted lines, may be substituted for the tongue or pole C. The driver's seat D is mounted on a standard D', secured to the cross-beam $a^2$. This standard may also rest on a rear cross-beam $a^3$, which connects the rear ends of the side beams $a$ and serves to further strengthen the frame. The cultivating and seed-planting devices are carried by a suspended frame E. This frame is shown as consisting of parallel side beams $e$, connected between their ends by cross-beams $e'$. The front and rear ends of the side beams $e$ are pivoted at $e^2$ to links F, which are pivoted to the side beams $a$ of the main frame A at $f$ and secure the frame E to the frame A, causing it to traverse the ground with the main frame, but permit of its being raised and lowered at the will of the operator.

On the cross-beam $a^3$ are mounted brackets G, in which is pivoted a cross-shaft H, carrying an operating-lever I, provided with detent mechanism J, engaging with a segmental rack J'. On opposite ends of the shaft H are secured segmental blocks K, which are preferably grooved on their periphery, and to these blocks are secured chains or other lifting devices K', which are secured to the frame E. By operating the hand-lever I the chains may be wound up on the segmental blocks K, and the frame E elevated to any desired position and held in place by the detent mechanism J. It will thus be seen that the frame carrying the cultivating and planting devices may be raised out of engagement with the ground and may be readily lowered for operation when desired.

At the front end of the frame E is mounted a spoked rimless wheel L. This wheel is preferably mounted centrally between the side beams of the frame on a shaft L', having end bearings $l$. As shown, the wheel is provided with six spokes $L^2$. Two of these spokes on opposite sides of the axis of the wheel are provided with cultivating teeth or shovels $l^2$, designed to open the ground for the reception of the seed-corn.

When the machine is used to do the original planting, I employ a cultivator or plow M, which may be secured to the cross-beams $e\ e'$, but which may be removed when the machine is used for replanting. At the rear end of the frame E are located seed-planting devices N. These devices are of an improved construction, and will now be specifically described.

A large hollow hub O is secured to a shaft $o$, journaled in end bearings $o'$ in the frame E. This hub is made large enough to contain a quantity of seed-corn or other grain, and is provided with a removable plug $o^2$, so that grain or corn may be supplied to the interior of the hub without disarranging other parts of the apparatus. The hub may be made in two sections secured together by bolts $o^3$, and it is provided, as shown in the drawings, with six spokes P P', arranged at equal distances apart and corresponding in size and position to the spokes of the cultivating-wheel L. The spokes P may be secured to the hub in any desired manner. The spokes P' are specially formed to receive and deliver the seed-corn in predetermined quantities and at regulated intervals. The spokes P' are hollow and each contains a plunger $P^2$. The plunger $P^2$ extends into a guide $p$ at its inner end, and is recessed at $p'$ to receive a spiral spring $p^2$, one end of which bears against a shoulder $p^3$ of the plunger, and the opposite end bears against a pin $p^4$, secured to the side of the casing. The outer end of the plunger extends outside of the spoke P', and is provided with a lateral projection or heel $p^5$, which limits the inward movement of the plunger. The plunger is slotted at $p^6$, and through this slot extends a pin $p^7$, which limits the movement of the plunger and guides it. Near its inner end the plunger is formed with a recess $r$, and at its outer end the plunger is enlarged and provided with guides forming a recess $r'$ to conduct the grain positively into the opening in the ground made for it by front wheel L. The enlarged outer end of the plunger is inclined at $r^2$, and the inner side of the spoke or casing is oppositely inclined at $r^3$. A brush or wiper R is secured to the inside of the casing and extending across it, so that grain or corn passing from the hub O cannot pass to the outer end of a spoke P' unless it is contained within the recess $r$. By this organization it results that when grain is fed from the hub O through the passage $o^4$ a predetermined number of grains will enter the recess $r$ when the plunger is in the position shown in Fig. 4, and when the plunger is moved outwardly by the force of the spring $p^2$ the corn in the recess $r$ is carried to the opposite side of the brush, and it falls into the passage $o^5$ along the inclines $r^2$ and $r^3$, and is there intercepted. When the plunger is moved inwardly to the position shown in Fig. 4, the corn will pass down the inclines $r^2$ into the recess $r'$ and be delivered to the opening in the ground made for it by the front wheel L. A covering-blade S is secured to each spoke P', but may be removed when the machine is used for the first planting. When thus used I employ covering-disks T, mounted in journals on the ends of arms T', secured to the frame E. These wheels are arranged at an angle, as shown, with their rear ends nearest together and flaring outwardly toward the front. When the machine is used for replanting, these wheels are removed.

On the front and rear axles L' and $o$, respectively, are mounted sprocket-wheels U, connected by chain gearing U', and this gearing is so arranged that the front and rear wheels revolve synchronously and correspondingly, so that the spokes on the rear wheels will enter the ground in the track of the spokes of the front wheel. The spokes by contact with the ground as the machine is drawn forward cause the revolution of the wheels.

Other gearing than that described between the front and rear axles may be employed, and the details of other parts of the machine may be varied without departing from the novel features of my invention.

I claim as my invention—

1. The combination, substantially as hereinbefore set forth, of the main frame, its supporting-wheels, the suspended frame, means for raising and lowering it, the front cultivating-wheel, the rear planting-wheel geared therewith, and planting devices carried by the planting-wheel.

2. The combination, substantially as hereinbefore set forth, of the supporting-frame, the suspended frame, means for raising and lowering it, the front wheel provided with rimless spokes, one or more of which are provided with cultivating-blades, the rear planting-wheel consisting of rimless spokes, one or more of which are hollow and provided with seed-planting devices, and gearing between the front and rear wheels.

3. The combination, substantially as hereinbefore set forth, of the front cultivating-wheel, the rear planting-wheel corresponding in size thereto, and gearing between the front and rear wheels for driving them synchronously.

4. The combination, substantially as hereinbefore set forth, of a supporting-frame, a hollow supply-hub, solid spokes radiating therefrom, one or more hollow spokes opening into the hollow hub, a spring-actuated plunger within each hollow spoke and projecting therefrom, recesses in said plunger for separating and carrying the grain, and a brush or wiper regulating the supply of grain.

5. The combination, substantially as hereinbefore set forth, of a supporting-frame, a hollow supply-hub, a hollow spoke radiating therefrom, a spring-actuated plunger within the hollow hub and projecting from the spoke, said plunger being provided with a recess $r$ near its inner end and with an enlarged outer end provided with a guide $r'$, and a brush or wiper R, contained within the hollow spoke, for the purpose specified.

In testimony whereof I have hereunto subscribed my name.

WARREN STONE WALKER.

Witnesses:
MARTIN B. POPE,
THOS. J. KEMAN.